US007567560B1

(12) United States Patent
Balasubramaniyan (10) Patent No.: US 7,567,560 B1
(45) Date of Patent: Jul. 28, 2009

(54) SYSTEM AND METHOD FOR SECURING A COMMUNICATION NETWORK

(75) Inventor: Jai S. Balasubramaniyan, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 1086 days.

(21) Appl. No.: 10/835,587

(22) Filed: Apr. 28, 2004

(51) Int. Cl.
*H04L 12/28* (2006.01)

(52) U.S. Cl. .................. 370/389; 370/395.2; 370/295.3; 370/401; 726/3

(58) Field of Classification Search ............... 370/395.3
See application file for complete search history.

(56) References Cited

U.S. PATENT DOCUMENTS

| 5,898,830 | A | 4/1999 | Wesinger, Jr. et al. ......... 726/15 |
| 6,052,788 | A | 4/2000 | Wesinger, Jr. et al. ......... 726/11 |
| 6,381,642 | B1 * | 4/2002 | O'Donnell et al. .......... 709/224 |
| 6,647,418 | B1 | 11/2003 | Maria et al. ................. 709/225 |
| 6,674,758 | B2 | 1/2004 | Watson ....................... 370/401 |
| 6,681,232 | B1 | 1/2004 | Sistanizadeh et al. ..... 707/104.1 |
| 6,684,336 | B1 | 1/2004 | Banks et al. ................. 709/227 |
| 6,687,245 | B2 * | 2/2004 | Fangman et al. ............ 370/356 |
| 7,047,561 | B1 * | 5/2006 | Lee ............................. 726/12 |
| 2004/0268150 | A1 * | 12/2004 | Aaron ......................... 713/201 |

* cited by examiner

*Primary Examiner*—Chi H. Pham
*Assistant Examiner*—Shick Hom
(74) *Attorney, Agent, or Firm*—Baker Botts L.L.P.

(57) ABSTRACT

A method for securing a communication network is provided. A communication session established between a local media endpoint located in a communication network and a remote media endpoint is detected. The communication session is assigned a session identifier. Packets communicated to the communication network are monitored. During a predetermined time period, only packets that identify the session identifier, a network address of the local media endpoint, a port of the local media endpoint, a network address of the remote media endpoint, and any port of the remote media endpoint are passed. After the predetermined time period, only packets that identify the session identifier, the network address of the local media endpoint, the port of the local media endpoint, the network address of the remote media endpoint, and a specific one of the ports of the remote media endpoint identified in packets passed during the predetermined time period are passed.

19 Claims, 5 Drawing Sheets

TOPOLOGY MAP

|  | PROXY$_1$ | PROXY$_2$ | ... | PROXY$_n$ | GATEWAY | ENDPOINT |
|---|---|---|---|---|---|---|
| INSIDE | 1.1.1.5 | 1.1.1.4 | ... | 1.1.1.3 | 1.1.1.2 | 1.1.1.1 |
| OUTSIDE | 2.2.2.5 | 2.2.2.4 | ... | 2.2.2.3 | 2.2.2.2 | 2.2.2.1 |

FIG. 5A

CALL FLOW ACCESS CONTROL LIST

| SOURCE ADDRESS | DESTINATION ADDRESS | SOURCE PORT | DESTINATION PORT | SESSION ID |
|---|---|---|---|---|
| 1.1.1.1 | 2.2.2.1 | 5060 | 20000 | 1 |
| 2.2.2.1 | 1.1.1.1 | 20000 | 5060 | 1 |
| 1.1.1.2 | 2.2.2.2 | 5060 | 20000 | 1 |
| 2.2.2.2 | 1.1.1.2 | 20000 | 5060 | 1 |
| 1.1.1.3 | 2.2.2.4 | 5060 | 20000 | 1 |
| 2.2.2.4 | 1.1.1.3 | 20000 | 5060 | 1 |
| 1.1.1.5 | 2.2.2.5 | 5060 | 20000 | 1 |
| 2.2.2.5 | 1.1.1.5 | 20000 | 5060 | 1 |
| 2.2.2.5 | 1.1.1.5 | 20001 | 5060 | 1 |
| ⋮ | ⋮ | ⋮ | ⋮ | ⋮ |
| 2.2.2.2 | 1.1.1.2 | 22002 | 5061 | 77 |

SYSTEM AND METHOD FOR SECURING A COMMUNICATION NETWORK

TECHNICAL FIELD OF THE INVENTION

The present invention relates in general to network security and, more particularly, to a system and method for securing a communication network.

BACKGROUND OF THE INVENTION

Application protocols conventionally use one control flow with one or more media flows between endpoints. A classic example is a file transfer protocol (FTP) transaction where the control flow is created between a single client and a single server and the media flow parameters are negotiated in the control channel. Securing a network in this context usually involves negotiating media flow parameters in the single control flow and narrowing available resources for media flow upon the start of the media flow.

However, recent application protocols, such as packet-based telephony application protocols, deviate from the principle of one control flow to many media flows. Instead, multiple signaling and media flows coexist. For example, a single signaling flow may govern multiple media flows, and the multiple media flows may pertain to one or more communication sessions. Alternatively, multiple signaling flows may govern a single media flow pertaining to one or more communication sessions. Furthermore, these application protocols often deviate from the client-server model in other ways. For example, a single flow may be initiated by or include multiple network nodes, such as gateways, proxy servers, and media endpoints, each of which will have a distinct source address and, perhaps, distinct port addresses. Thus, previous security methods may be unworkable and ineffective to meet the needs of these recent application protocols.

SUMMARY OF THE INVENTION

From the foregoing, it may be appreciated by those skilled in the art that a need has arisen to provide security of a network utilizing application protocols with multiple related signaling and media flows. In accordance with the present invention, a system and method for securing a communication network are provided that substantially eliminate or greatly reduce disadvantages and problems associated with multiple-flow application protocols.

According to an embodiment of the present invention, a method for securing a communication network is provided. A communication session established between a local media endpoint located in a communication network and a remote media endpoint is detected. The communication session is assigned a session identifier. Packets communicated to the communication network are monitored. During a predetermined time period, only packets that identify the session identifier, a network address of the local media endpoint, a port of the local media endpoint, a network address of the remote media endpoint, and any port of the remote media endpoint are passed. After the predetermined time period, only packets that identify the session identifier, the network address of the local media endpoint, the port of the local media endpoint, the network address of the remote media endpoint, and a specific one of the ports of the remote media endpoint identified in packets passed during the predetermined time period are passed.

The present invention provides various technical advantages. For example, one technical advantage is the ability to secure a communication network supporting multiple-flow application protocols. Another technical advantage is to be able to monitor communications to a communication network to determine which packets should be passed to the local network and which packets should be dropped. Yet another technical advantage is the ability to ensure communication signaling conformance, as well as access control list management of multiple related flows.

Other technical advantages may be readily apparent to those skilled in the art from the following figures, description, and claims. Moreover, while specific advantages have been enumerated, various embodiments may include all, some, or none of the enumerated advantages.

BRIEF DESCRIPTION OF THE DRAWINGS

For a more complete understanding of the present invention and the advantages thereof, reference is now made to the following description taken in conjunction with the accompanying drawings, wherein like reference numbers represent like parts, in which.

DETAILED DESCRIPTION OF THE INVENTION

Figure 1:
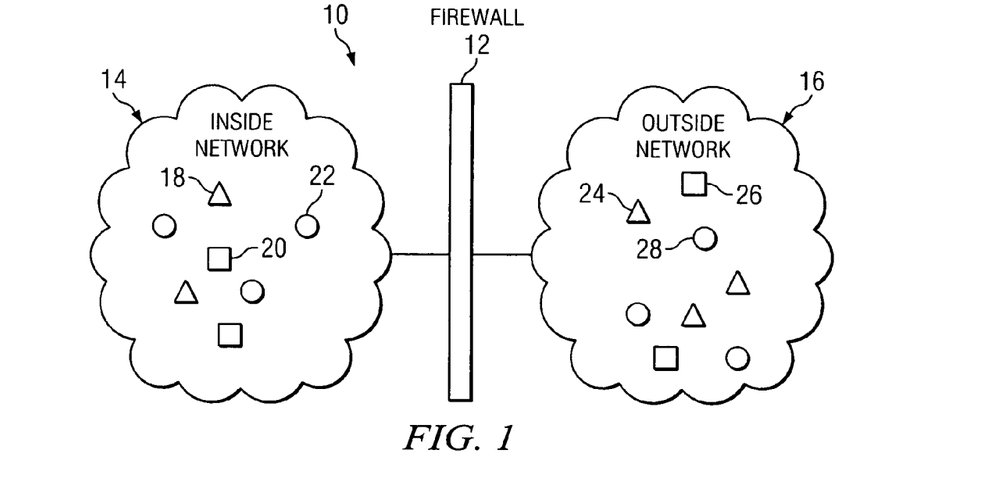
FIG. 1 illustrates a communication system that includes a firewall enabled to secure a communication network.

FIG. 1 illustrates a communication system, indicated generally at 10, that includes a firewall 12 interconnecting inside network 14 and outside network 16. In inside network 14, a number of inside media endpoints 18 interconnect with other network elements, such as inside gateways 20 and inside proxy servers 22. Similarly, in outside network 16, any number of outside media endpoints 24 interconnect with other network elements, such as outside gateways 26 and outside proxy servers 28. During operation, one or more communication sessions may be established between a particular inside media endpoint 18 and a particular outside media endpoint 24. To support one or more communication sessions, multiple signaling and media flows may be established within system 10. To prevent unauthorized access to or interference with these communication sessions and/or network elements, system 10 supports mechanisms to provide for network security. For example, to secure inside network 14, firewall 12 monitors signaling and media flows to detect potential security problems and, if appropriate, may respond to detected problems. Firewall 12 may also record information related to communication sessions in order to appropriately analyze signaling and media flows.

Firewall 12 represents hardware and/or appropriate controlling logic capable of securing a communication network. According to particular embodiments, firewall 12 monitors network traffic and ensures proper initiation of communication sessions between inside media endpoints 18 and 24. Firewall 12 may also or additionally enforce security policies, such as a policy established for a particular communication session. Upon detecting a security anomaly, such as an improper setup or policy violation, firewall 12 may take appropriate action. According to particular embodiments, firewall 12 utilizes one or more databases to maintain up to date security information related to one or more communication sessions. When firewall 12 detects a security violation, firewall 12 may take one or more actions. For example, firewall 12 may drop packets and/or update security databases associated with a communication session.

Inside network 14 and outside network 16 each represent any suitable collection and arrangement of components capable of interconnecting communications equipment. For example, inside network 14 and outside network 16 may each encompass some or all of networks such as a local area network, a public switched telephone network (PSTN), and one or more private networks. Any number of links and/or components within inside network 14 may interconnect inside media endpoints 18, inside gateways 20, and inside proxy servers 22. Any number of links and/or components within outside network 16 may interconnect outside media endpoints 24, outside gateways 26, and outside proxy servers 28. Note that inside network 14 is called inside because firewall 12 acts to protect network elements within inside network 14. Thus, from the perspective of firewall 12, inside network 14 is located on the inside of firewall 12 while outside network 16 is located on the outside of firewall 12.

Inside media endpoints 18 and outside media endpoints 24 each represent hardware, including appropriate controlling logic, capable of interconnecting with other network components and establishing communication sessions. Inside media endpoints 18 and outside media endpoints 24 each support application protocols that utilize multiple signaling and media flows. For example, in some embodiments, inside media endpoints 18 and outside media endpoints 24 represent packet-based telephony devices that support session initiation protocol (SIP). Note that inside media endpoints 18 are called inside because firewall 12 acts to protect inside media endpoints 18. Thus, from the perspective of firewall 12, inside media endpoints 18 are located on the inside of firewall 12 while outside media endpoints 24 are located on the outside of firewall 12.

Inside gateways 20 and outside gateways 26 each represent any suitable collection and arrangement of hardware and associated logic for interconnecting subnetworks or other network elements within inside network 14. Similarly, inside proxy servers 22 and outside proxy servers 28 each represent any suitable collection of hardware and/or controlling logic for interconnecting subnetworks or other elements of inside network 14. Furthermore, inside proxy servers 22 and outside proxy servers 28 each may seek to prevent hackers or other unauthorized users to access privileged information, such as network addresses, port addresses, or other information. Again, note that inside gateways 20 and inside proxy servers 22 are called inside because firewall 12 acts to protect these network components. Thus, from the perspective of firewall 12, inside gateways 20 and inside proxy servers 22 are located on the inside of firewall 12 while outside gateways 26 and outside proxy servers 28 are located on the outside of firewall 12.

In operation, firewall 12 may use one or more techniques to secure a communication network. One or more inside media endpoints 18 may establish one or more communication sessions with one or more outside media endpoints 24. For example, a particular inside media endpoint 18 may establish a communication session, such as a VoIP call, with a particular outside media endpoint 24. Within inside network 14, the communication session may involve one or more inside gateways 20 and/or inside proxy servers 22. Within outside network 16, the communication session may involve one or more outside gateways 26 and/or outside proxy servers 28. For example, using a SIP connection, inside media endpoint 18 may communicate packets with outside media endpoint 24 through one or more intermediate network nodes.

In general, firewall 12 may intercept and/or monitor signaling and media flows communicated between inside network 14 and outside network 16. For instance, firewall 12 may analyze contents of particular packets to determine whether to pass, drop, block, or otherwise direct a particular packet. Furthermore, firewall 12 may keep a record of particular aspects of packets passing through firewall 12 in order to appropriately analyze future packets. For example, firewall 12 may generate a topology map using contents of particular packets. Moreover, firewall 12 may use recorded information to determine whether or not to "tear down" or deallocate resources associated with particular communication sessions or aspects of particular communication sessions. Furthermore, firewall 12 may require that each packet includes a proper session identifier.

According to a particular embodiment, firewall 12 may monitor or intercept packets communicated by inside network 14 and intended for outside network 16. For example, firewall 12 may monitor or intercept packets that request initiation of a communication session. A packet requesting initiation may be analyzed to determine initial parameters associated with a communication session, such as a source address and a source port associated with inside media endpoint 18 and a destination address and a destination port associated with outside media endpoint 24. Note that in particular embodiments a destination port may not be identified, but a wildcard may be used to represent that any destination port may be used. Furthermore, firewall 12 may analyze the packets requesting initiation of a communication session to determine whether a session identifier is included. Alternatively, firewall 12 may assign a session identifier to a packet requesting initiation of a communication session if a session identifier is not already specified. Each of the initial parameters may be stored in a database list, such as a call flow access control list. Additionally, firewall 12 may generate a topology map using inside network nodes identified in the packet or packets requesting initiation of a communication session.

Firewall 12 may also analyze packets communicated by outside network 16 and intended for inside network 14. For example, firewall 12 may analyze packets to determine whether parameters that match the initial parameters are included. In some embodiments, session identifiers must be included in each packet. When session identifiers are not included in a particular packet, the particular packet may be dropped. Firewall 12 may also analyze the packets to update topology maps with information regarding outside network nodes identified in the packet or packets responding to a communication session invitation.

Firewall 12 may use one or more database structures to secure inside network 14. For example, to secure inside network 14, firewall 12 may utilize a call flow access control list. The call flow access control list may include the source addresses, destination addresses, source ports, destination ports, and session identifiers of every active communication session. This list may be used to determine whether packets should be dropped, blocked, passed, or otherwise handled by firewall 12. Therefore, firewall 12 may constantly update the call flow access control list to keep the list current. For example, for communication session transfers and/or communication session conferencing, call flow access control lists may be dynamically updated to include network addresses and/or port addresses of the additional endpoints.

As mentioned, firewall 12 may support procedures to generate one or more topology maps for one or more communication sessions. Packets communicating a communication session invitation may identify topology information related to the sending endpoint. For example, in a packet sent by inside media endpoint 18 requesting initiation of a communication session, network addresses and port addresses may be supplied that identify inside media endpoints 18 and outside media endpoints 24, inside gateways 20, and inside proxy servers 22. In a packet sent by outside media endpoint 24 responding to the communication session invitation, network addresses and port addresses may be supplied that identify outside gateways 26 and outside proxy servers 28, as well as specific port addresses of outside media endpoint 24 if a wildcard was used by inside media endpoint 18. Firewall 12 may accumulate the topology information to generate one or more topology maps. The topology maps may be used by firewall 12 to anticipate signaling and media flows from various nodes within system 10. For example, firewall 12 may only pass packets identifying network addresses and port addresses recorded in the topology map.

Furthermore, in certain instances, firewall 12 may maintain a status database identifying signaling and media flows associated with particular communication sessions. As used herein, signaling flow represents control information communicated between network nodes in system 10 while media flow represents communication of data between nodes within system 10. Thus, using a status database, firewall 12 may identify nodes and ports of nodes associated with particular communication sessions, signaling flows, and/or media flows. Moreover, firewall 12 may use the data within the status database to determine an appropriate time to tear down resources allocated to nonexistent or currently unused communication sessions.

Firewall 12 may perform various other steps to secure inside network 14. For example, firewall 12 may analyze communications to determine whether an appropriate order of communications has been followed. Determining whether an appropriate order of communications has been followed is sometimes called call conformance. In the case of a VoIP call, firewall 12 may determine whether a proper order of SIP primitives has been followed. While not every SIP primitive may be required, an improper order of SIP primitives may be detected, and appropriate corrective action may be taken. As another example of actions that may be taken to secure inside network 14, firewall 12 may use the status database to determine whether a communication session is inactive or has timed out. For example, times and dates of the latest communications may be stored in the status database. Periodically, firewall 12 may analyze the status database to determine whether a particular communication session has timed-out. Resources allocated to an inactive communication session may be deallocated and the topology map and status database may be purged of information related to the inactive communication session.

Note that the particular configuration illustrated and the accompanying description provide only a particular embodiment for implementing the concepts described herein. It should be understood that system 10 contemplates using any appropriate component to secure a communication network using one or more network applications. For example, while described as occurring within firewall 12, which provides a link between inside network 14 and outside network 16, operations may occur within any appropriate part of system 10 capable of securing a communication network. For example, some or all of the capabilities described with respect to firewall 12 may be provided within one or more inside proxy servers 22, inside gateways 20, or other appropriate nodes. However, the following description will focus in greater detail upon functional elements and operation of firewall 12 in securing the local communication network.

Figure 2:
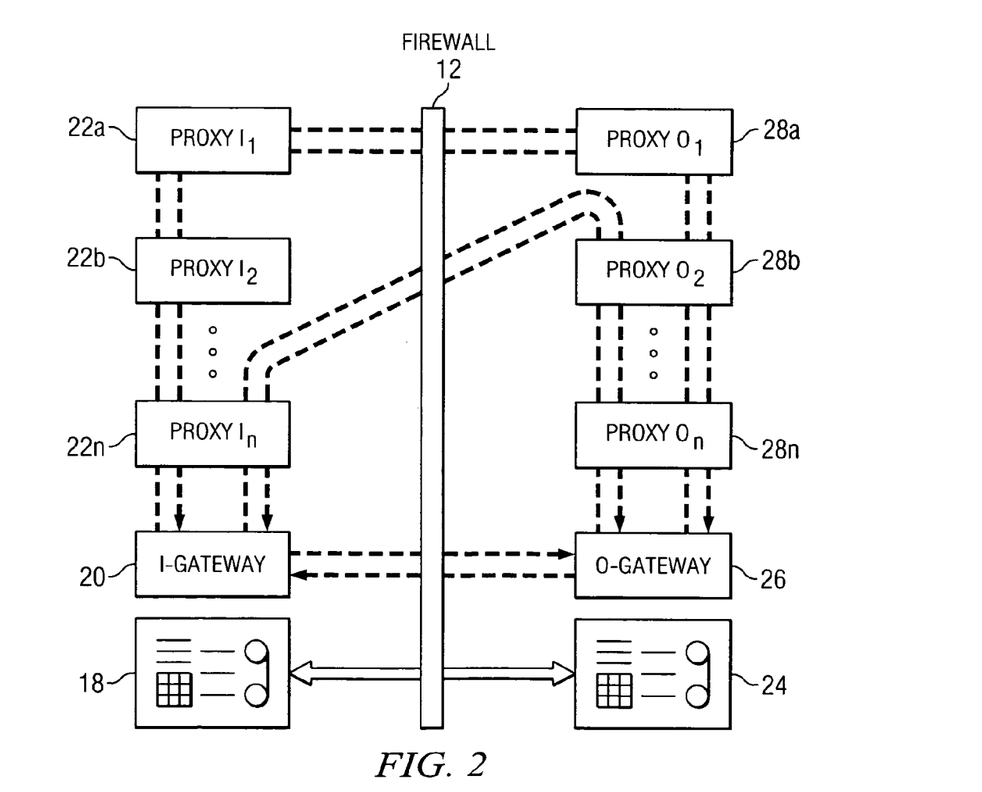
FIG. 2 is a block diagram illustrating use of the firewall in a particular network scenario.

FIG. 2 illustrates a block diagram showing one embodiment of a communication session having multiple signaling flows and one media flow. As illustrated, firewall 12 may operate to secure the illustrated communication flows.

Inside media endpoint 18, here illustrated in the form of a packet-based telephone device, is associated with inside gateway 20 and inside proxy servers 22a, 22b, and 22n. On the other side of firewall 12, outside media endpoint 24 is associated with outside gateway 26 and outside proxy servers 28a, 28b, and 28c.

As illustrated, signaling and media flows among and between network nodes may take multiple routes. For example, as illustrated, media data may flow directly between inside media endpoint 18 and outside media endpoint 24, while signaling data may be communicated between inside gateway 20 and outside gateway 26, between inside proxy server 22n and outside proxy server 28b, and between inside proxy server 22a and outside proxy server 28a. Note, of course, that FIG. 2 illustrates only one embodiment of potential routes of signaling and media data. Furthermore, multiple communication sessions may utilize the same signaling and media paths illustrated. For example, multiple communication sessions, such as VoIP calls, may utilize the same media flow between inside media endpoint 18 and outside media endpoint 24, but different signaling flows.

To initialize one or more communication sessions, a session invitation may be communicated from inside media endpoint 18 to outside media endpoint 24. The invitation may be communicated along a path through inside gateway 20, inside server proxy 22n, inside server proxy 22b, and inside server proxy 22a. When communicated through firewall 12, the invitation may be monitored or intercepted. For example, firewall 12 may update one or more databases or lists to reflect information included in the invitation. For example, a call flow access control list may be initialized. Alternatively or in addition, a topology map and a status database may be initiated. Each of these databases or lists allows firewall 12 to properly secure access to inside network 14.

In some embodiments, the session invitation and thus the call flow access control list may include a wildcard for the destination port. After forwarding the invitation to outside media endpoint 24, firewall 12 may allow responses that correctly identify various parameters included in the call flow access control list to pass through firewall 12. For example, during a predetermined time period, firewall 12 may accept and pass packets identifying any port of the outside media endpoint 24. The call flow access control list may be updated to include each port identified during the predetermined time period. Then, after the predetermined time period, firewall 12 may only pass packets identifying one of the ports of the outside media endpoint 24 identified during the predetermined period.

The signaling flow between inside proxy server 22n and outside proxy server 28b may represent a signaling flow associated with a recorded route. A recorded route represents a path a particular signaling flow is required to take because one or more network nodes are required to be in the path. For example, inside proxy server 22n, outside proxy server 28b, and outside proxy server 28*n* may each notify firewall 12 that they must be included in a particular signaling flow. Because these nodes are required to be in the path, firewall 12 may update appropriate databases and create the recorded route. Firewall 12 may then only pass data packets indicating they were forwarded through these network nodes.

Note that firewall 12 may recognize and pass packets communicated through the signaling flow between inside gateway 20 and outside gateway 26. For example, the SIP primitive BYE may be communicated directly between inside gateway 20 and outside gateway 26 at the end of a VoIP call. After a BYE primitive has been communicated, or at any other appropriate time, firewall 12 may operate to tear down resources dedicated to the communication session.

Note of course that the signaling and media flows shown in FIG. 2 are illustrative. Various other signaling and media flows may be used to communicate information and data through system 10. Furthermore, more or less signaling and media flows may be used.

Figure 3:
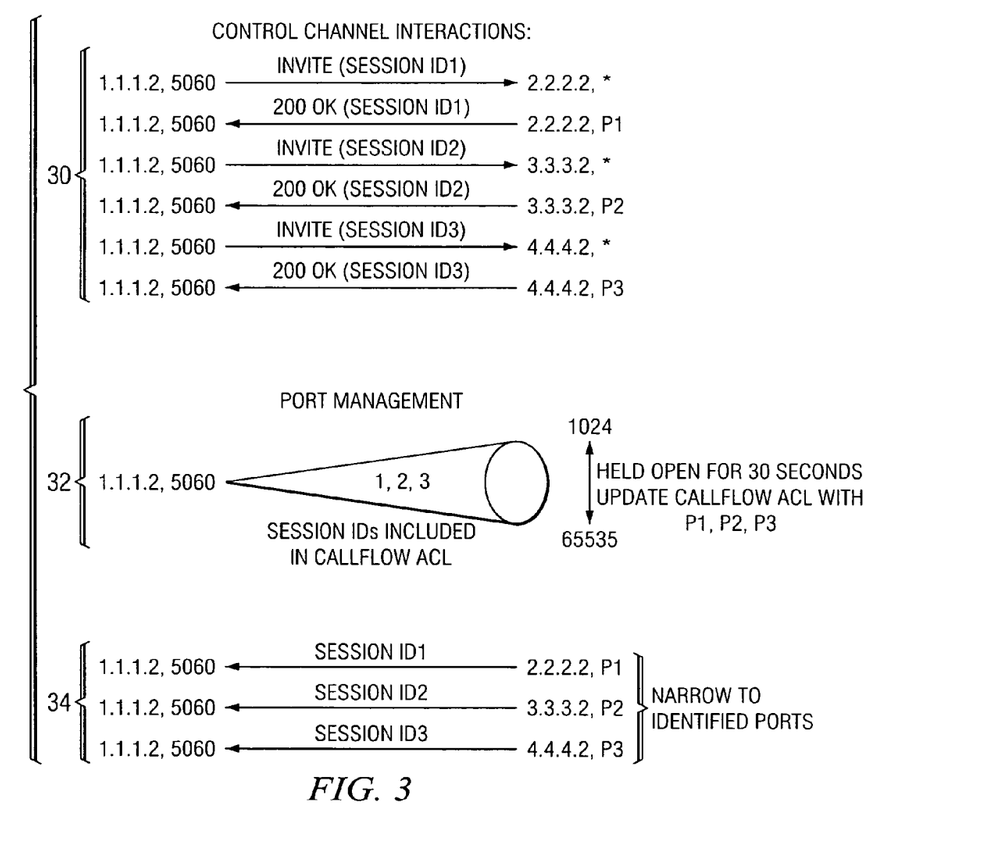
FIG. 3 illustrates management of network access by the firewall.

FIG. 3 illustrates management of network access by firewall 12. In general, a series of control channel interactions between inside gateway 20 and outside gateways 26 are shown, and port management by firewall 12 is represented.

Communications 30 are transmitted between network nodes identified by network addresses. For purposes of explanation, inside gateway 20 at network address 1.1.1.2 communicates with three outside gateways 26 at network addresses 2.2.2.2, 3.3.3.2, and 4.4.4.2. However, note that any network nodes may be used. Furthermore, inside gateway 20 uses port 5060, while outside gateways 26 use P1, P2, and P3 respectively. Again, however, note that any port addresses may be used. Also note that each communication 30 includes a session identifier.

As illustrated, INVITE communications are sent from network address 1.1.1.2 to network addresses 2.2.2.2, 3.3.3.2, and 4.4.4.2. The INVITE communications do not specify port addresses of outside gateways 26 but rather indicate that any port address is proper by using a wildcard. Acknowledgements sent by 2.2.2.2, 3.3.3.2, and 4.4.4.2 respectively identify port addresses P1, P2, and P3. While not illustrated, note that firewall 12 may construct a topology map using information included with these communications. For example, each session invitation and acknowledgment may include a network stack identifying network addresses of network nodes and relationships between network nodes through which the communication traveled. Firewall 12 may extract this information and store the information in the topology map for future use in determining whether to allow packets to pass through firewall 12. While only communication session invitations and acknowledgements of communication session invitations have been illustrated, various types of communications 30 may be transmitted between network nodes.

One port management technique includes firewall 12 only passing communications 30 that identify proper session identifiers. Firewall 12 may intercept and/or monitor communications 30 to secure inside network 14. For example, firewall 12 intercept each communication to determine whether each includes a proper session identifier. Communications without session identifiers or with improper session identifiers may be dropped. Thus, as illustrated at 34, a communication from 2.2.2.2 may be required to include the session identifier 1.

Another port management technique illustrated at 32 involves firewall 12 passing packets that identify a range of possible port addresses for outside gateways 26 during a predetermined period of time. After the predetermined period of time, however, firewall 12 may only pass packets that identify port addresses used and/or identified during the predetermined time period as illustrated at 34.

During the predetermined time period, firewall 12 may allow packets that identify any port of outside gateways 26 to pass through firewall 12. Alternatively or in addition, firewall 12 may only pass packets that identify a port of outside gateways 26 within a particular subset of port addresses, such as a port within the range of 1024 to 65535. During the predetermined time period, the call flow access control list may be updated to reflect the identified port addresses of outside gateways 26. For example, port address P1 which is used in association with the acknowledgement sent from 2.2.2.2 to 1.1.1.2 may be associated with network node 2.2.2.2 and communication session identifier 1 in the call flow access control list.

After the predetermined time period, firewall 12 may only pass certain packets through firewall 12. For example, firewall 12 may only pass packets indicating a port address identified in the call flow access control list as being associated with the session identifier. In other words, packets may only pass through firewall 12 if the port address identified in the packet was first identified during the predetermined time period. Thus, as illustrated, a packet communicated from 2.2.2.2 that identifies port P1 may be allowed to pass through firewall 12 if port P1 was first identified during the predetermined time period.

Using these and other techniques, firewall 12 may secure inside network 14 by preventing unauthorized packets from entering inside network 14. While specific network addresses, port addresses, communications, and port management techniques have been described, note that various parameters and techniques may be used as appropriate without departing from the spirit and scope of the present invention.

Figure 4:
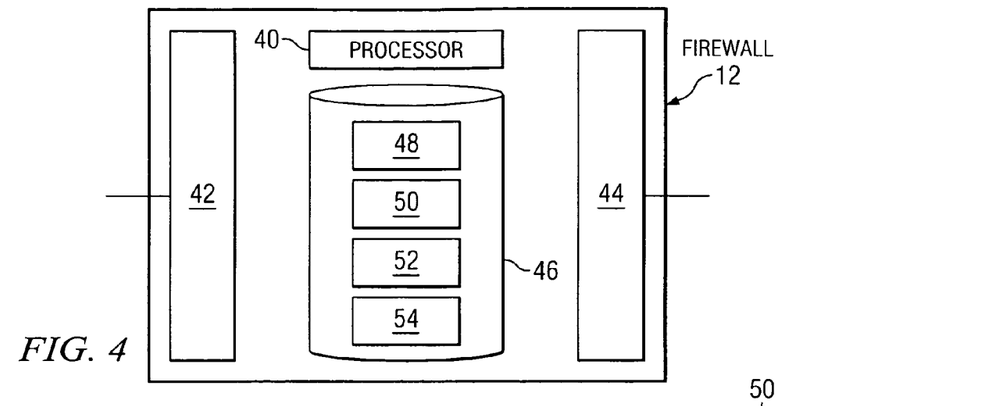
FIG. 4 is a block diagram illustrating exemplary functional components of the firewall.

FIG. 4 is a block diagram illustrating exemplary functional components of firewall 12, including a processor 40, an inside interface 42, an outside interface 44, and a memory 46. These elements may operate to provide security of a network using the operations described herein.

Processor 40 represents any suitable combination of hardware and/or controlling logic capable of managing and controlling the operation of firewall 12. For example, processor 40 may include one or more microprocessors or controllers capable of loading and executing software applications to perform various functions. However, the configuration and operation of processor 40 may depend upon the particular implementation of firewall 12 within system 10.

Inside interface 42 and outside interface 44 each represent hardware, including any appropriate controlling logic, for linking to and interacting with other elements of system 10. To enable this interaction, inside interface 42 and outside interface 44 may encompass any suitable number and types of communication links capable of communicating using any appropriate protocols. As illustrated in FIG. 1, firewall 12 may provide a link between inside network 14 and outside network 16. Thus, for example, inside interface 42 may link to one or more elements within inside network 14, while outside interface 44 may link to one or more elements within outside network 16. In this fashion, firewall 12 can provide a physical link between networks. Firewall 12 may thus monitor and intercept network traffic passing between inside network 14 and outside network 16.

In the embodiment illustrated, memory 46 maintains inspection module 48, topology maps 50, call flow access control list 52, and status database 54. Inspection module 48 includes software, executable files, and/or appropriate logic modules capable when executed to control the operation of firewall 12. For example, inspection module 48 may include executable files capable of securing a communication network. Topology map 50 includes data identifying topology associated with one or more communication sessions. For example, a particular topology map 50 may include network addresses, port addresses, and other identifying information related to media endpoints, gateways, and proxy servers associated with a particular communication session. Call flow access control list 52 includes parameters reserved for one or more communication sessions. For example, call flow access control list 52 may indicate source addresses, destination addresses, source ports, destination ports, and session identifiers related to one or more communication sessions. Thus, call flow access control list 52 may identify allowable flows of signaling or media data. Status database 54 includes data related to particular communication sessions. For example, a particular session entry may include data related to network addresses and port addresses of nodes, a recorded route, data related to signaling flows and directions of signaling flows, data related to media flows and directions of media flows, and a current state of the communication session. Status database 54 may organize and associate all this data with a session identifier.

In operation, inside interface 42 and/or outside interface 44 may receive and transmit packets communicated between inside network 14 and outside network 16. Processor 40 may execute instructions found in inspection module 48 to determine whether to allow a particular packet to pass through firewall 12. For example, processor 40 may execute instructions in inspection module 48 to compare parameters identified in particular packets with information stored in topology maps 50, call flow access control list 52, and/or status database 54. Furthermore, processor 40 may execute instructions found in inspection module 48 to update data found in topology maps 50, call flow access control list 52, and status database 54. Particular examples of the operation of firewall 12 are provided below with respect to FIGS. 6 and 7. Additionally, particular examples of topology maps 50, call flow access control list 52, and status database 54 are provided below with respect to FIGS. 5A-C.

Note that while the preceding description focuses on a particular embodiment of firewall 12 that includes specific elements, system 10 contemplates firewall 12 having any suitable combination and arrangement of elements for securing a communication network. Therefore, the modules and functionalities described may be separated or combined as appropriate, and some or all of the functionalities of firewall 12 may be performed by logic encoded in media, such as software and/or programmed logic devices. Also, some or all of the functions of firewall 12 may be incorporated within other elements, such as within proxy servers 22. Thus, for example, while illustrated and described as a network firewall, some or all of the functionality described may be provided within any other appropriate element within system 10. Furthermore, only particular elements of firewall 12 are illustrated, and it should be understood that firewall 12 may include any number and type of elements for performing various networking and monitoring functions.

Figure 5A:
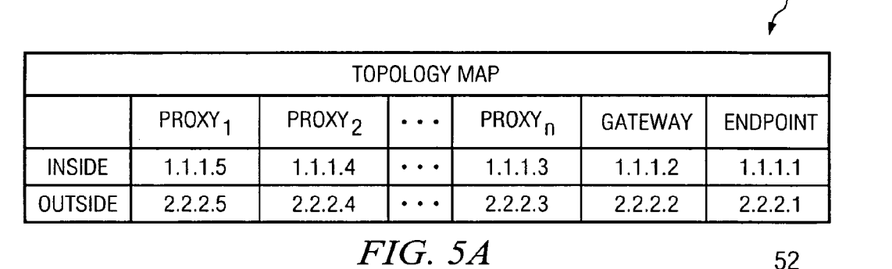
FIG. 5A illustrates an exemplary topology map.

FIG. 5A illustrates one example of topology map 50 that may be created and stored by firewall 12. In topology map 50, network addresses of proxy servers, gateways, and media endpoints are recorded. Note that while a particular number of proxy servers, gateways, and endpoints are recorded, topology map 50 may include various numbers of each network node. A separate topology map may be created for each communication session, or one topology map may be created for multiple communication sessions. In addition, while the illustrated topology map 50 includes only network addresses, topology map 50 may include port addresses as well as any other appropriate information.

Figure 5B:
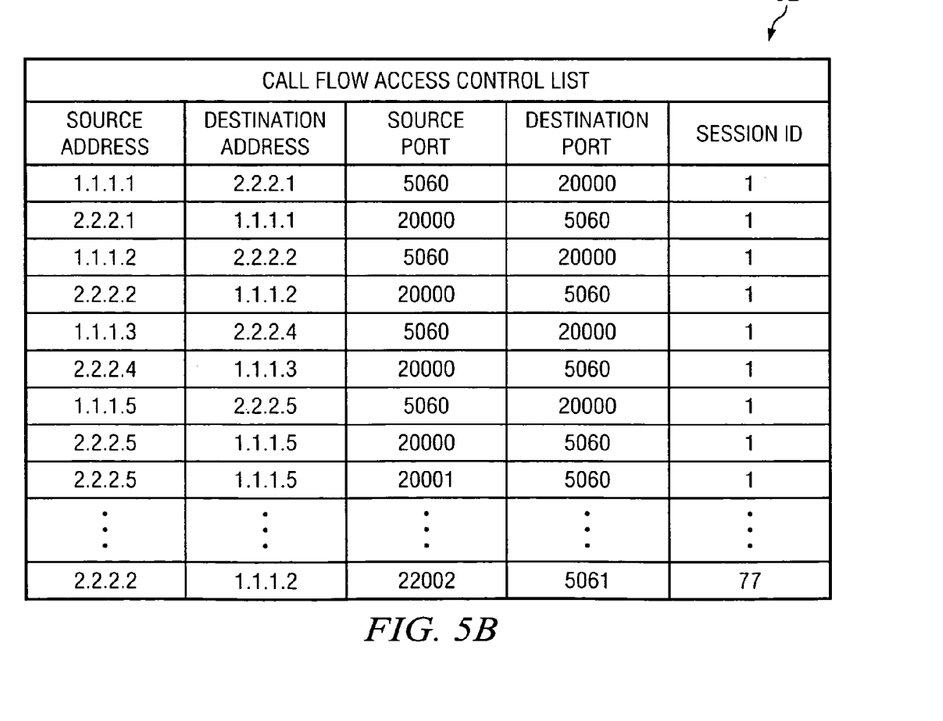
FIG. 5B illustrates an exemplary call flow access control list.

FIG. 5B illustrates one example of call flow access control list 52 that may be created and stored by firewall 12. Note that source addresses, destination addresses, source ports, destination ports, and session identifiers are recorded for each flow. Note that various parameters may be associated with various flows. For example, ports 5060 and 20000 have been recorded multiple times. In addition, while the illustrated call flow access control list 52 includes various parameters, call flow access control list 52 may include various other appropriate information.

Figure 5C:
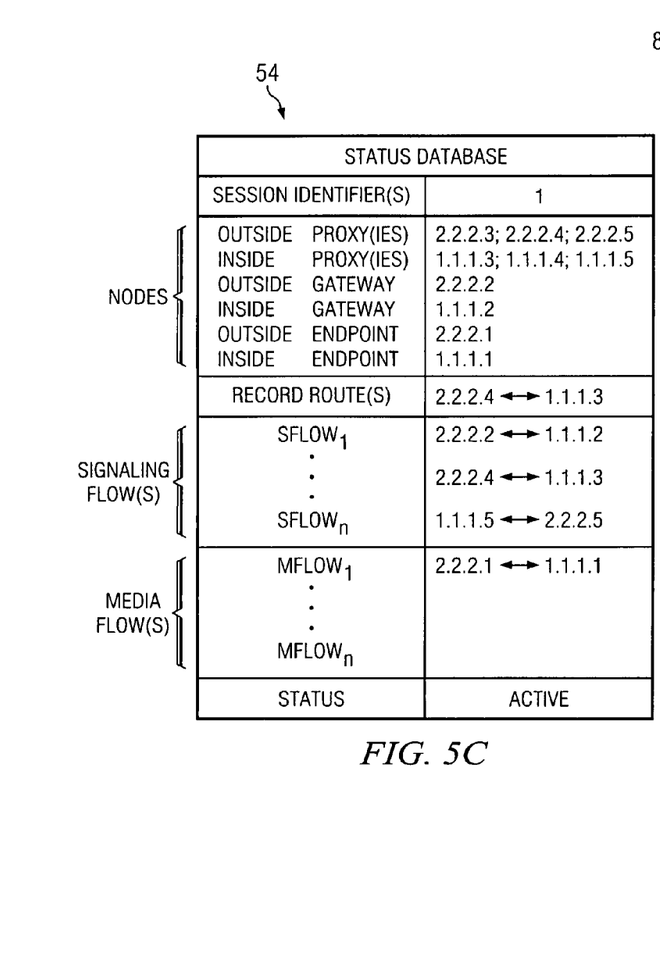
FIG. 5C illustrates an exemplary status database.

FIG. 5C illustrates one example of status database 54 that may be created and stored by firewall 12. Status database 54 includes various parameters associated with one or more communication sessions. For example, status database 54 stores parameters associated with the session identified using session identifier number 1. Network addresses are indicated for network nodes associated with the communication session and a recorded route as well as signaling flows and media flows are identified. Note that while the illustrated status database 54 includes various parameters, status database 54 may include various other appropriate information. For example, status database 54 may indicate the latest use of resources allocated to the communication session, a current status of the communication session such as active or inactive, and information identifying directions of data flows.

Figure 6:
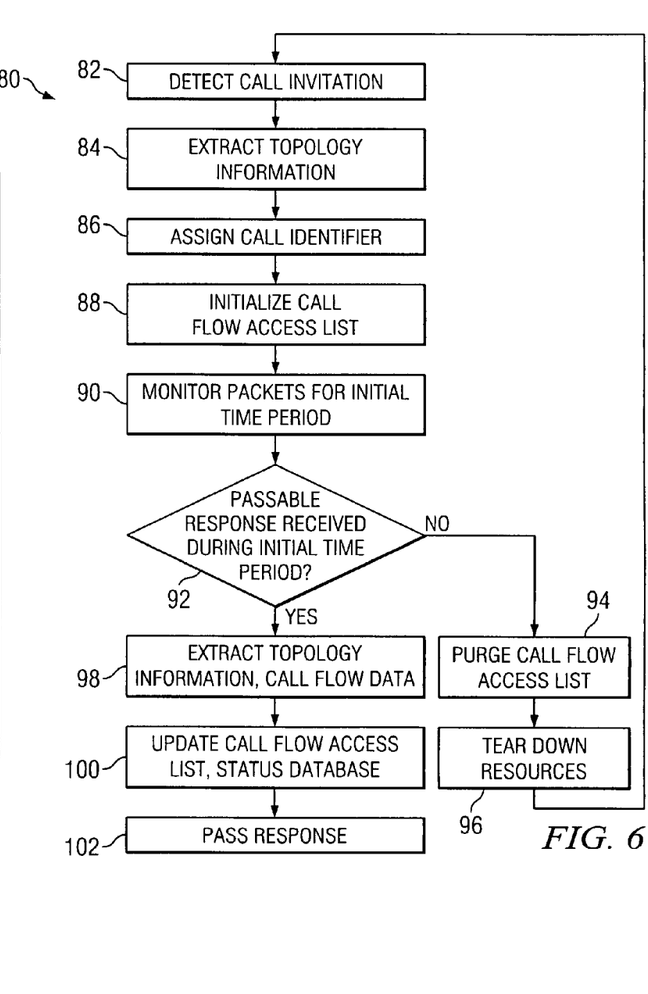
FIG. 6 is a flowchart illustrating a method for securing a communication network during initialization of a communication session.

FIG. 6 illustrates a method 80 for establishing a secure communication network. Firewall 12 detects a call invitation at step 82. For example, firewall 12 may intercept a packet from inside media endpoint 18 in the form of a SIP primitive requesting a communication session. Firewall 12 extracts topology information from the call invitation at step 84. For example, a network stack may be included that identifies network nodes through which the call invitation traveled. Firewall 12 may use this information to initialize or update topology map 50. Firewall 12 assigns a session identifier to the call invitation at step 86. For example, if the call invitation does not already include a session identifier, firewall 12 may append an identifier to the call invitation.

Firewall 12 initializes call flow access control list 52 at step 88. For example, call flow access control list 52 may include the assigned session identifier, the network address of the inviting endpoint, a port address of the inviting endpoint, a destination network address of the invited endpoint, and a wildcard for the destination portion of the invited endpoint. Firewall 12 may later utilize call flow access control list 52 to determine whether to pass or drop received packets.

Firewall 12 monitors received packets for an initial time period at step 90. The time period may be of any length, such as thirty seconds. During this time period, firewall 12 may determine whether packets communicated to firewall 12 from outside network 16 should be passed to inside network 14 at step 92. For example, firewall 12 may compare parameters in the received packets with parameters identified in call flow access control list 52. For example, firewall 12 may require that all parameters match the parameters listed in call flow access control list 52. If no passable response is received during the initial time period, firewall 12 may purge the entry from call flow access control list 52 at step 94. Furthermore, firewall 12 may tear down allocated resources at step 96 before returning to step 82. Returning to step 92, if at least one passable response is received during the initial time period, firewall 12 may extract topology information and call flow data at step 98. For example, firewall 12 may update topology map 50 and status database 54 at step 100. At step 102, firewall 12 passes the response within inside network 14.

Thus, method 80 illustrates one technique for securing a communication network. Method 80 may be used during initiation of a communication session or at any other appropriate time.

Figure 7:
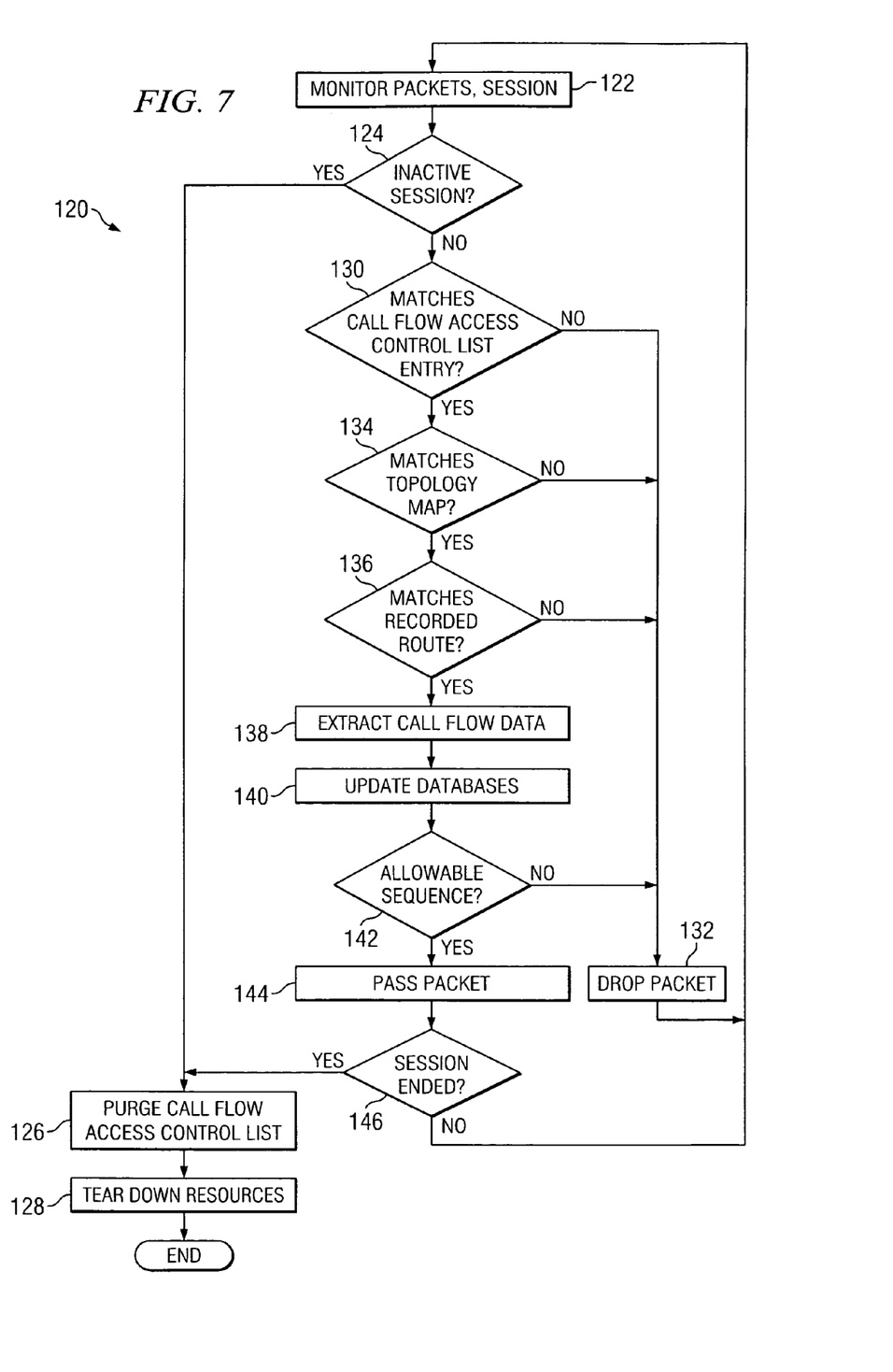
FIG. 7 is a flowchart illustrating a method for securing a communication network after initialization of a communication session.

FIG. 7 illustrates a method 120 for maintaining and terminating a secure communication network. Firewall 12 monitors packets received by firewall 12 and the status of a communication session at step 122. For example, firewall 12 may intercept packets communicated between inside network 14 and outside network 16. Firewall 12 determines whether a session is inactive at step 124. For example, firewall 12 may analyze data stored within memory 46, such as within status database 54, to determine whether a predetermined time period has elapsed since a last transmission in any signaling or media flow associated with the session identifier. An inactive session may be detected if the predetermined time period has elapsed. When an inactive session is detected, firewall 12 may purge a call flow access control list 52 entry related to the inactive session at step 126. Thereafter, packets identifying the inactive session will not be allowed to pass. Furthermore, firewall 12 may tear down resources allocated to the communication session at step 128. For example, resources listed in status database 54 may be deallocated.

Returning to step 124, if an inactive session is not detected, parameters in a received packet or packets may be compared with parameters identified in a call flow access control list 52 entry at step 130. For example, network addresses and port addresses may be compared. Alternatively or in addition, a session identifier may be compared. When the parameters in the packets do not match those listed in the call flow access control list 52 entry, the packets are dropped at step 132. On the other hand, if the parameters match, the network stack included in the packet or packets may be compared with topology map 50 at step 134. If the network stack does not match topology map 50, the packets are dropped at step 132. In some embodiments, a matching network stack may not need to include every network node in topology map 50, but only must pass through network nodes identified in topology map 50. If the network stack does match topology map 50, firewall 12 determines whether the packets adhere to the recorded route, if any, at step 136. In other words, if status database 54 includes a recorded route for a particular session, firewall 12 may ensure that the network nodes in the recorded route are identified in the network stack at step 136. If the recorded route is not matched, the packets are dropped at step 132. If the recorded route is matched, method 120 continues to step 138.

Call flow data may be extracted from the packets at step 138. Appropriate call flow data may be used to update call flow access control list 52, status database 54, or any other appropriate list or database at step 140. For example, a date and time of the communication may be recorded in status database 54.

Firewall 12 determines whether the packets indicate an allowable sequence of communications at step 142. For example, SIP primitives may be required to follow a particular order. While one or more commands may be skipped, certain commands may not be communicated before other commands. When a faulty sequence is detected, appropriate action may be taken. For example, the out-of-order packets may be dropped at step 132. When the sequence of communications is appropriate, however, the packets may be passed, for example, to inside network 14 at step 144.

At step 146, a determination is made whether the passed packets indicated that the communication session had ended. For example, the SIP primitive BYE indicates the termination of a VoIP call. The BYE communication may be communicated from outside gateway 26 to inside gateway 20. When the communication session has ended, call flow access control list 52 may be purged at step 126 and resources may be torn down at step 128. On the other hand, if the session has not ended, method 120 returns to step 122 to continue monitoring packets and the status of the session.

Thus, method 120 illustrates one technique for maintaining and terminating a secure communication network. Method 120 may be used after initiation of a communication session or at any other appropriate time.

While the preceding flowcharts illustrate particular methods for firewall 12 to establish, maintain, and terminate a secure communication network, these flowcharts illustrate only exemplary methods of operation, and system 10 contemplates firewall 12 using any suitable techniques, elements, and applications for performing similar security enhancing techniques. Thus, many of the steps in these flowcharts may take place simultaneously and/or in different orders than as shown. In addition, firewall 12 may use methods with additional steps, fewer steps, and/or different steps, so long as the methods remain appropriate.

Thus, it is apparent that there has been provided, in accordance with the present invention, a system and method for securing a communication network that satisfies the advantages set forth above. Although the present invention has been described in detail, it should be understood that various changes, substitutions, and alterations may be readily ascertainable by those skilled in the art and may be made herein within departing from the spirit and scope of the present invention as defined in the following claims. Moreover, the present invention is not intended to be limited in any way by any statement made herein that is not otherwise reflected in the following claims.

What is claimed is:

1. A method for securing a communication network comprising:
    detecting a communication session established between a local media endpoint located in the communication network and a remote media endpoint;
    assigning a session identifier to the communication session;
    monitoring packets communicated to the communication network;
    during a predetermined time period, only passing packets that identify the session identifier, a network address of the local media endpoint, a port of the local media endpoint, a network address of the remote media endpoint, and any port of the remote media endpoint; and
    after the predetermined time period, only passing packets that identify the session identifier, the network address of the local media endpoint, the port of the local media endpoint, the network address of the remote media endpoint, and a specific one of the ports of the remote media endpoint identified in packets passed during the predetermined time period;
    building a topology map for the communication session using topology information included in packets communicated between the local media endpoint and the remote media endpoint, the topology map identifying network addresses and ports of network nodes through which packets travel, the network nodes including proxy servers and gateways; and
    only passing packets that include topology information that identifies a network address and a port of at least one of the network nodes in the topology map.

2. The method of claim 1, further comprising:
building a status database for a plurality of communication sessions, the status database identifying, for each communication session:
a current state of the communication session;
a direction of media flow associated with the communication session; and
network addresses and ports of proxy servers, gateways, and local and remote media endpoints associated with the communication session.

3. The method of claim 1, further comprising dropping packets that include instructions that fail to conform to a predetermined sequence of instructions.

4. The method of claim 1, further comprising tearing down the communication session in response to determining that the communication session is inactive for a predetermined inactivity period.

5. The method of claim 1, further comprising:
determining whether the communication session has been transferred to a third media endpoint; and
dynamically updating a status database entry associated with the communication session to identify a network address and a port of the third media endpoint in response to determining that the communication session has been transferred to the third media endpoint.

6. The method of claim 1, wherein the communication session is a Voice over Internet Protocol (VoIP) session established between a local VoIP phone and a remote VoIP phone using Session Initiation Protocol (SIP).

7. An apparatus for securing a communication network, comprising:
a first interface coupled to a local media endpoint located in the communication network;
a second interface coupled to a remote media endpoint;
a controller operable to detect a communication session established between the local media endpoint and the remote media endpoint, to assign a session identifier to the communication session, to monitor packets communicated to the communication network, during a predetermined time period, to only pass packets that identify the session identifier, a network address of the local media endpoint, a port of the local media endpoint, a network address of the remote media endpoint, and any port of the remote media endpoint, and, after the predetermined time period, to only pass packets that identify the session identifier, the network address of the local media endpoint, the port of the local media endpoint, the network address of the remote media endpoint, and a specific one of the ports of the remote media endpoint identified in packets passed during the predetermined time period;
wherein the controller is further operable to:
build a status database for a plurality of communication sessions, the status database identifying, for each communication session:
a current state of the communication session;
a direction of media flow associated with the communication session; and
network addresses and ports of proxy servers, gateways, and local and remote media endpoints associated with the communication session.

8. The apparatus of claim 7, wherein the controller is further operable to:
build a topology map for the communication session using topology information included in packets communicated between the local media endpoint and the remote media endpoint, the topology map identifying network addresses and ports of network nodes through which packets travel, the network nodes including proxy servers and gateways; and
only pass packets that include topology information that identifies a network address and a port of at least one of the network nodes in the topology map.

9. The apparatus of claim 7, wherein the controller is further operable to drop packets that include instructions that fail to conform to a predetermined sequence of instructions.

10. The apparatus of claim 7, wherein the controller is further operable to tear down the communication session in response to determining that the communication session is inactive for a predetermined inactivity period.

11. The apparatus of claim 7, wherein the controller is further operable to:
determine whether the communication session has been transferred to a third media endpoint; and
dynamically update a status database entry associated with the communication session to identify a network address and a port of the third media endpoint in response to determining that the communication session has been transferred to the third media endpoint.

12. The apparatus of claim 7, wherein the communication session is a Voice over Internet Protocol (VoIP) session established between a local VoIP phone and a remote VoIP phone using Session Initiation Protocol (SIP).

13. A processor readable medium encoded with software for securing a communication network which when executed performs the steps of:
detecting a communication session established between a local media endpoint located in the communication network and a remote media endpoint;
assigning a session identifier to the communication session;
monitoring packets communicated to the communication network;
during a predetermined time period, only passing packets that identify the session identifier, a network address of the local media endpoint, a port of the local media endpoint, a network address of the remote media endpoint, and any port of the remote media endpoint; and
after the predetermined time period, only passing packets that identify the session identifier, the network address of the local media endpoint, the port of the local media endpoint, the network address of the remote media endpoint, and a specific one of the ports of the remote media endpoint identified in packets passed during the predetermined time period;
tearing down the communication session in response to determining that the communication session is inactive for a predetermined inactivity period.

14. The processor readable medium of claim 13, further operable when executed to perform the steps of:
building a topology map for the communication session using topology information included in packets communicated between the local media endpoint and the remote media endpoint, the topology map identifying network addresses and ports of network nodes through which packets travel, the network nodes including proxy servers and gateways; and
only passing packets that include topology information that identifies a network address and a port of at least one of the network nodes in the topology map.

15. The processor readable medium of claim 13, further operable when executed to perform the step of:

building a status database for a plurality of communication sessions, the status database identifying, for each communication session:
a current state of the communication session;
a direction of media flow associated with the communication session; and
network addresses and ports of proxy servers, gateways, and local and remote media endpoints associated with the communication session.

16. The processor readable medium of claim 15, further operable when executed to perform the step of dropping packets that include instructions that fail to conform to a predetermined sequence of instructions.

17. The processor readable medium of claim 13, further operable when executed to perform the steps of:
determining whether the communication session has been transferred to a third media endpoint; and
dynamically updating a status database entry associated with the communication session to identify a network address and a port of the third media endpoint in response to determining that the communication session has been transferred to the third media endpoint.

18. The processor readable medium of claim 13, wherein the communication session is a Voice over Internet Protocol (VoIP) session established between a local VoIP phone and a remote VoIP phone using Session Initiation Protocol (SIP).

19. An apparatus for securing a communication network, comprising:
means for detecting a communication session established between a local media endpoint located in the communication network and a remote media endpoint;
means for assigning a session identifier to the communication session;
means for monitoring packets communicated to the communication network;
means for, during a predetermined time period, only passing packets that identify the session identifier, a network address of the local media endpoint, a port of the local media endpoint, a network address of the remote media endpoint, and any port of the remote media endpoint; and
means for, after the predetermined time period, only passing packets that identify the session identifier, the network address of the local media endpoint, the port of the local media endpoint, the network address of the remote media endpoint, and a specific one of the ports of the remote media endpoint identified in packets passed during the predetermined time period;
means for determining whether the communication session has been transferred to a third media endpoint; and
means for dynamically updating a status database entry associated with the communication session to identify a network address and a port of the third media endpoint in response to determining that the communication session has been transferred to the third media endpoint.

* * * * *